US010303251B1

(12) United States Patent
Kim

(10) Patent No.: US 10,303,251 B1
(45) Date of Patent: *May 28, 2019

(54) VARIABLE DISPLAY CLOCK FOR REDUCED BANDWIDTH IN A HEAD-MOUNTED DISPLAY

(71) Applicant: Facebook Technologies, LLC, Menlo Park, CA (US)

(72) Inventor: Cheonhong Kim, Mountain View, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,396

(22) Filed: Jan. 14, 2019

Related U.S. Application Data

(63) Continuation of application No. 15/623,097, filed on Jun. 14, 2017, now Pat. No. 10,248,198.

(51) Int. Cl.
*G06F 3/01* (2006.01)
(52) U.S. Cl.
CPC .............. *G06F 3/013* (2013.01); *G06F 3/012* (2013.01); *G09G 2310/08* (2013.01); *G09G 2340/0435* (2013.01)

(58) Field of Classification Search
CPC .......... G06F 3/012–013; G09G 3/3659; G09G 2340/04–0435; G09G 2350/00; G09G 2310/08
See application file for complete search history.

(56) References Cited

U.S. PATENT DOCUMENTS

| | | |
|---|---|---|
| 2003/0169247 A1 | 9/2003 | Kawabe et al. |
| 2010/0056274 A1 | 3/2010 | Uusitalo et al. |
| 2018/0059420 A1 | 3/2018 | Woo et al. |

*Primary Examiner* — Liliana Cerullo
(74) *Attorney, Agent, or Firm* — Fenwick & West LLP

(57) ABSTRACT

A head mounted display (HMD) for displaying variable resolution frames for focus and non-focus areas of a user's eye. The HMD includes the display panel including gate lines and data lines, and a display driver coupled to the display panel. The display driver includes a gate signal duplicator that duplicates gate signal values across multiple adjacent gate lines for the non-focus area, and provides individual gate signals to gate lines for the focus area. The display driver may also include a programmable oscillator that generates a clock signal for the gate lines as a function of the size of the focus area relative to the size of the frame. In some embodiments, the display driver includes a data signal duplicator that duplicates data signal values across multiple adjacent data lines for the non-focus area, and provides individual data signals to data lines for the focus area.

20 Claims, 10 Drawing Sheets

VARIABLE DISPLAY CLOCK FOR REDUCED BANDWIDTH IN A HEAD-MOUNTED DISPLAY

CROSS REFERENCE TO RELATED APPLICATIONS

This application is a continuation of pending U.S. application Ser. No. 15/623,097, filed Jun. 14, 2017, which is incorporated by reference in its entirety.

BACKGROUND

HMD's generate displays for a viewer's eyes. Because of the high frame rates that are desirable for HMDs, the frame resolution of display data may be limited. For example, there may be wired or wireless bandwidth limitations between an electronic display of the HMD and the computer that generates the image data to be displayed. Such bandwidth limitations can result in less than desirable frame resolution or frame rates for HMD.

SUMMARY

A head mounted display (HMD) for displaying variable resolution frames having focus and non-focus areas of a user's eye. The variable resolution frame can include a lower resolution at non-focus areas and a higher (e.g., native) resolution at the focus area(s), thus resulting in a smaller data size (e.g., less than a native resolution frame) and lower bandwidth usage during transmission of the variable resolution frame.

In some embodiments, the HMD includes a display panel including a plurality of display lines and a display driver. The pixels of the display panel are defined at intersections of the display lines. The display lines may include gate lines and data lines. The display driver is coupled to the display panel and includes a gate signal duplicator. The gate signal duplicator receives a stream of gate signal values. In a first mode of the gate signal duplicator, the gate signal duplicator provides a first gate signal value to a first gate data line and a second gate line adjacent to the first trace gate line. In a second mode of the signal duplicator, the gate signal duplicator provides the first gate signal value to the first gate line and a second gate signal value to the second gate line. The second gate signal value may be subsequent to the first gate signal value in the stream of gate signal values. The pixels of the display panel may correspond with a non-focus area of a user's eye in the first mode and a focus area of the user's eye in the second mode.

In some embodiments, the display driver includes a programmable oscillator coupled to the gate signal duplicator, the programmable oscillator generator configured to generate a gate clock signal for the gate lines, the gate clock signal defining a row time as $$\frac{t_F}{l + \frac{n-l}{2}},$$

where $t_F$ is a frame time of the frame, l is a pixel row size of the focus area within the frame, and n is a pixel row size of the frame.

In some embodiments, the display driver includes data signal duplicator that receives a stream of data signal values. In a first mode of the data signal duplicator, the data signal duplicator provides a first data signal value to a first data line and a second data line adjacent to the first data line. In a second mode of the data signal duplicator, the data signal duplicator provides the first data signal value to the first data line and a second data signal value to the second data line. The second data signal value is subsequent to the first data signal value in the stream of data signal values.

Some embodiments may include a method including: determining a focus area and a non-focus area of a display panel of a head-mounted display (HMD) based on tracking position of an eye of a user, the display panel including display lines, pixels of the display panel defined at intersections of the display lines, the display lines including gate lines; receiving a stream of gate signal values associated with the focus area and the non-focus area by a display driver coupled to the display panel, the display driver including a gate signal duplicator; in a first mode of the gate signal duplicator, providing a first gate signal value from the stream to a first gate line and a second gate line adjacent to the first gate line; and in a second mode of the gate signal duplicator, providing the first gate signal value to the first gate line and a second gate signal value to the second gate line, the second gate signal value being subsequent to the first gate signal value in the stream of gate signal values.

Some embodiments may include an electronic display having a display panel and a display driver as discussed herein.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A head mounted display (HMD) for displaying variable resolution frames having focus and non-focus areas of a user's eye. The variable resolution frame can include a lower resolution for non-focus areas and a higher (e.g., native) resolution for the focus area(s), thus resulting in a smaller data size (e.g., than a native resolution frame) and lower bandwidth usage during transmission of the frame. The HMD includes the display panel including gate lines and data lines, and a display driver coupled to the display panel. The display driver includes a gate signal duplicator that duplicates gate signal values across multiple adjacent gate lines for the non-focus area, and provides individual gate signals to gate lines for the focus area. The display driver may also include a programmable oscillator that generates an adjustable clock signal for the gate lines as a function of the size of the focus area relative to the size of the frame. In some embodiments, the display driver further includes a data signal duplicator that duplicates data signal values across multiple adjacent data lines for the non-focus area, and provides individual data signals to data lines for the focus area. By operating the gate signal duplicator and the data signal duplicator based on the focus and non-focus areas as discussed herein, the variable resolution frame with adjustable focus area is displayed across the entire pixel area of the display panel (e.g., having a larger native pixel resolution than the resolution of the variable resolution frame, particularly in the non-focus areas).

System Overview

Figure 1:
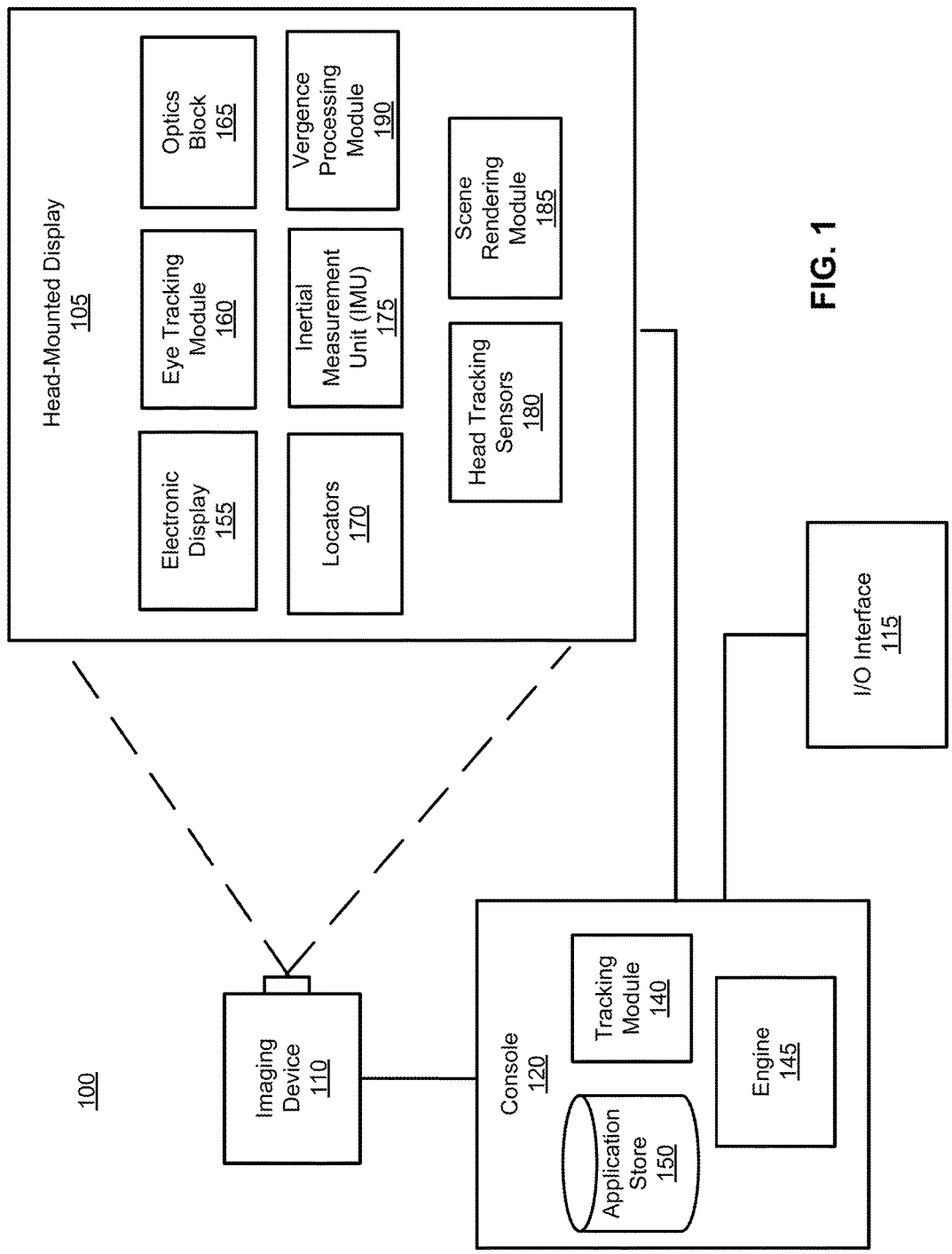
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

As discussed in further detail below, the electronic display 115 provides a display of gaze contingent content concurrent with eye position detection. The detection of eye tracking information is used as an input to generate (e.g., a subsequent video frame) of gaze contingent content. The gaze contingent content may include variable resolution frames of image data, where regions of pixels associated with a focus area of a user's eye have a higher resolution than regions of pixels associated with non-focus areas. The electronic display 115 includes a display driver that adapts to different variable resolution frames having different focus areas to display the variable resolution frame across the pixels of the display panel of the electronic display 115.

The optics block 165 adjusts its focal length responsive to instructions from the console 120. In some embodiments, the optics block 165 includes a multi multifocal block to adjust a focal length (adjusts optical power) of the optics block 165.

The eye tracking module 160 tracks an eye position and eye movement of a user of the HMD 105. The light detectors of the electronic display 115 (e.g., or elsewhere in the HMD 105) capture image information of a user's eyes, and the eye tracking module 160 uses the captured information to determine eye tracking information such as the focus area and non-focus area(s) of the user's eyes on a display panel, interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from an engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 115 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the engine 145.

The engine 145 executes applications within the system 100 and receives position information, acceleration information, velocity information, predicted future positions, or some combination thereof for the HMD 105 from the tracking module 140. Based on the received information, the engine 145 determines content to provide to the HMD 105 for presentation to the user, such as a virtual scene, one or more virtual objects to overlay onto a real world scene, etc.

In some embodiments, the engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The engine 145 generates instructions for the optics block 165, the instructions causing the optics block 165 to adjust its focal distance to a particular location. The engine 145 generates the instructions based on focal capability information and, e.g., information from the vergence processing module 190, the IMU 175, and the head tracking sensors 180. The engine 145 uses the information from the vergence processing module 190, the IMU 175, and the head tracking sensors 180, or some combination thereof, to select an ideal focal plane to present content to the user. The engine 145 then uses the focal capability information to select a focal plane that is closest to the ideal focal plane. The engine 145 uses the focal information to determine settings for one or more SHWPs, one or more active liquid crystal lenses, or some combination thereof, within the optics block 176 that are associated with the selected focal plane. The engine 145 generates instructions based on the determined settings, and provides the instructions to the optics block 165.

The engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
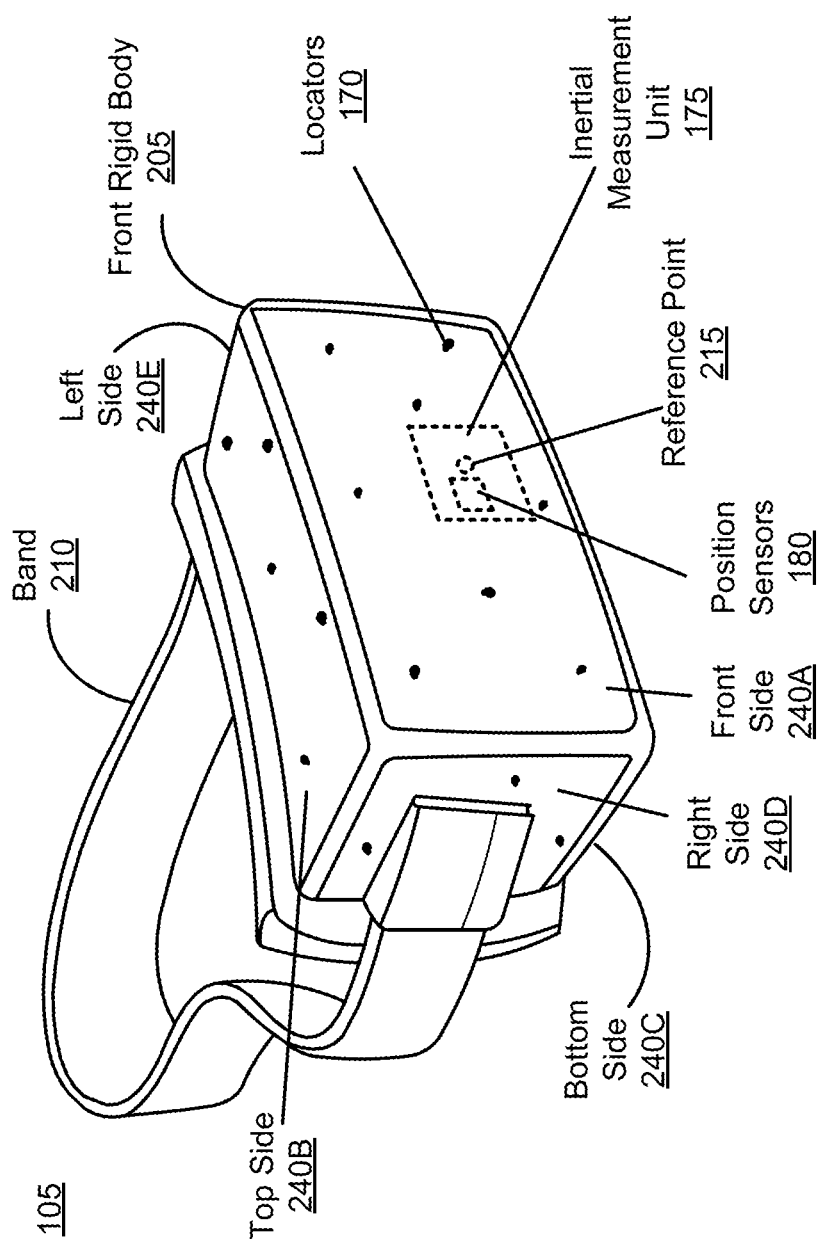
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected.

In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
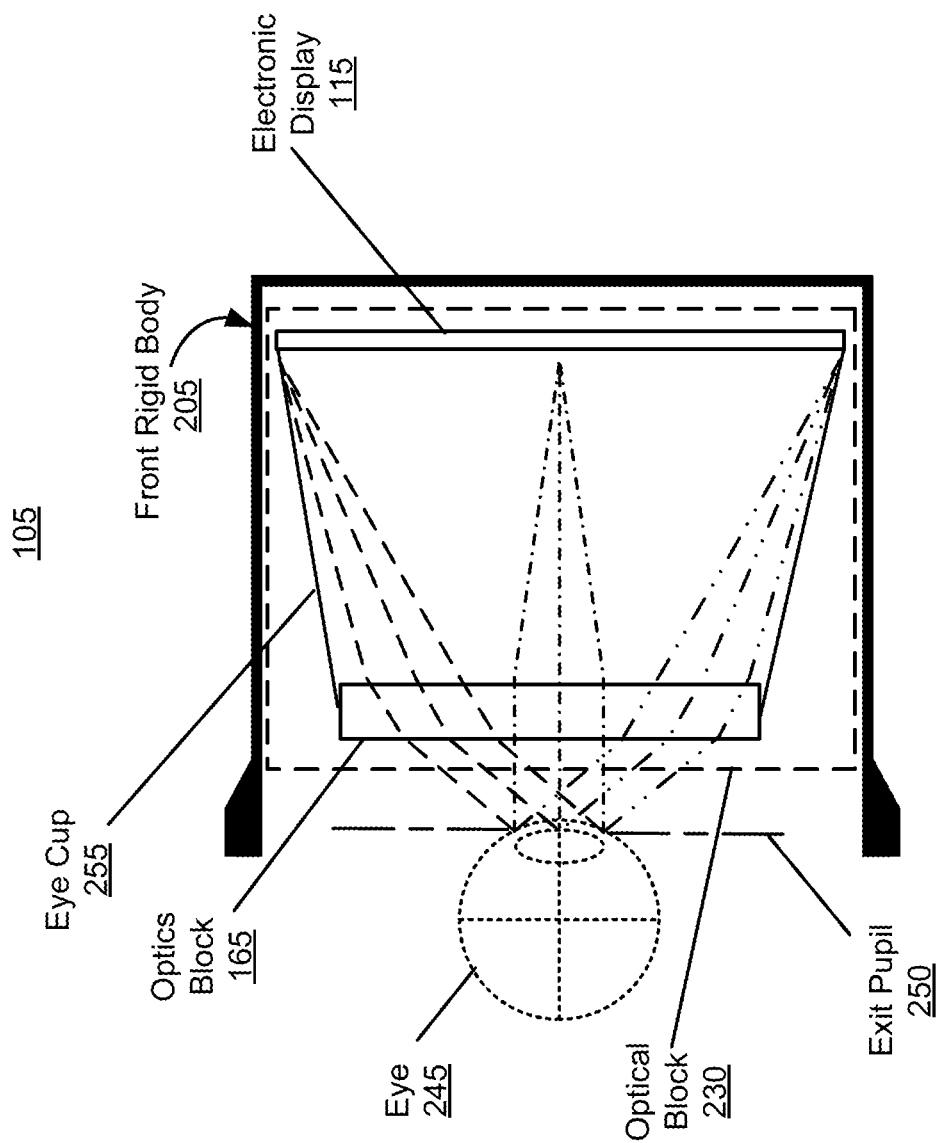
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes the electronic display 115 and an optical block 230. The optical block 230 provides altered image light from the electronic display 115 to an exit pupil 250. The exit pupil 250 is the location in the front rigid body 205 where a user's eye 245 is positioned. Although a single optical block 230 is shown in FIG. 3, the front rigid body 205 may include two optics blocks, one for each eye of the user.

The optical block 230 includes an optics block 165 and an eye cup 255. The eye cup 255 is mechanically secured with the front rigid body 205, and holds the optics block 165. The electronic display 115 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cup 255 may be omitted from the optical block 230.

The electronic display 115 emits image light for the optical block 230. As discussed in greater detail below, various regions of the electronic display 115 can be selectively controlled to display a variable resolution frame. Pixels of the electronic display 115 corresponding with a focus area of the eye 245 may operate at a native resolution where pixels are programmed (e.g., in a raster fashion for a frame) individually, while pixels outside of the focus area of the eye 245 may operate with a reduced resolution where multiple pixels are programmed as a group with a common pixel value.

Figure 4:
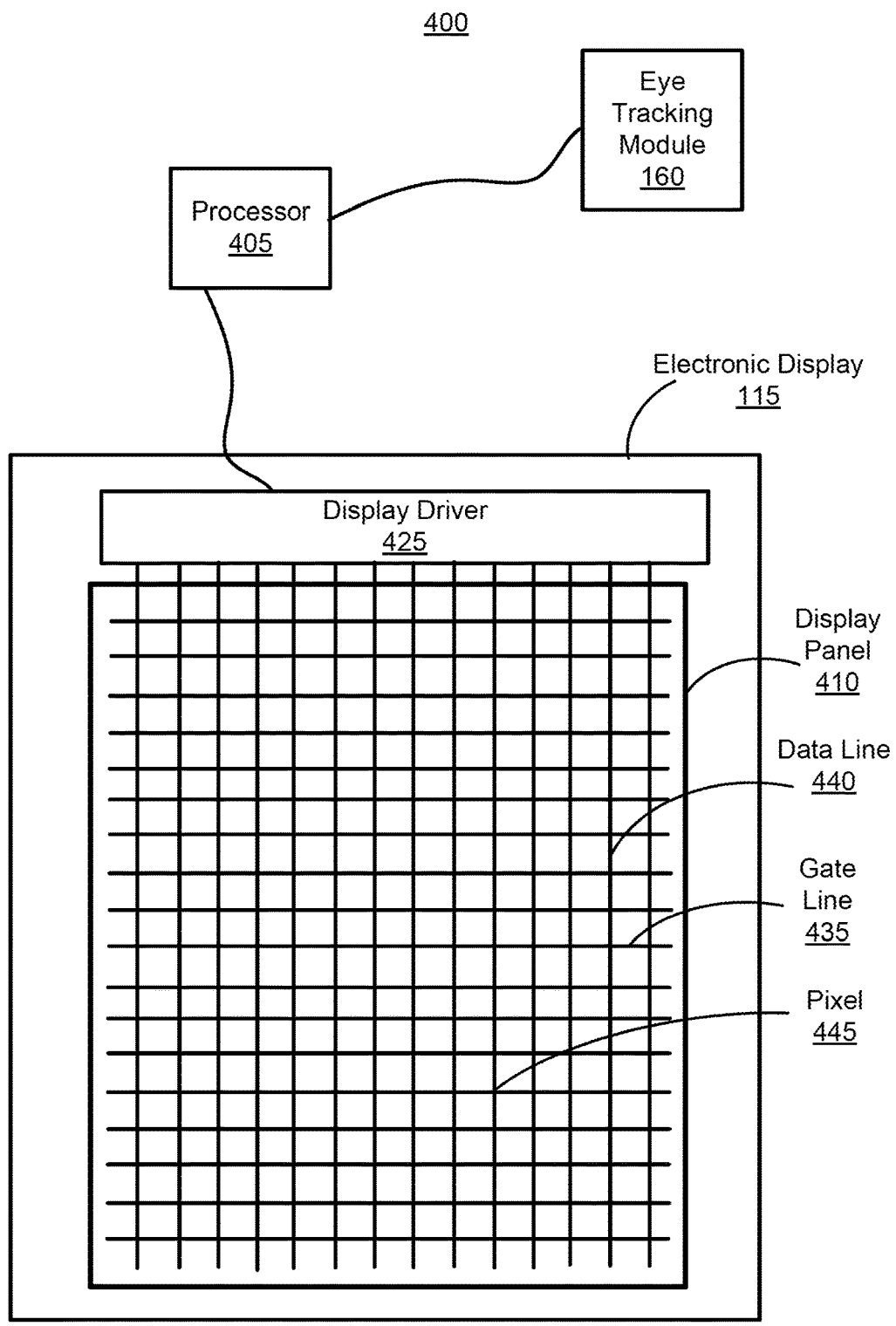
FIG. 4 shows a block diagram of system architecture for an electronic display of the HMD, in accordance with some embodiments.

FIG. 4 shows a block diagram of system architecture 400 for the electronic display 115, in accordance with some embodiments. The system architecture 400 includes a processor 405, the eye tracking module 160, and the electronic display 115. The electronic display 115 may utilize various types of display technologies such as inorganic light emitting diode (ILED (e.g., micro-LED)), liquid crystal display (LCD) or organic light emitting diode (OLED (e.g., active matrix OLED (AMOLED)). In some embodiments, the electronic display 115 is incorporated within the HMD 105. In other embodiments, the electronic display 115 may be part of some other electronic device, e.g., a mobile device, computer monitor, a television set, etc.

The electronic display 115 includes a display panel 410, and a display driver 425. The display panel 410 includes a (e.g., matrix) of pixels 445 defined at the intersections of display lines and that are controlled by the display lines, such as gate lines 435 addressing pixel rows and data lines 440 addressing pixel columns. In some embodiments, the gate lines 435 and data lines 440 are coupled to a thin-film transistor (TFT) layer of the display panel 410 that controls programming of the pixels 445.

The display driver 425 is coupled to the processor 405 and the display panel 410. In some embodiments, the display driver 425 includes a data driver and a gate driver. In other embodiments, the electronic display 115 includes a separate data driver and gate driver. The display driver 425 is coupled to the data lines 440 of the display panel 410 to provide data signals to the data lines 445 selected for programming by gate signals on the gate lines 435. The display driver 425 selectively provides data signals to the data lines 440 to display image data defining a variable resolution frame. For example, multiple adjacent data lines may receive a common data signal from the display driver 425. Here, a low resolution portion of the variable resolution frame may be displayed with each pixel value being programmed to two or more pixels 445 of the display panel 410. In another example, the display driver 425 can provide different data signals to the adjacent data lines. Here, a high or native resolution portion of the variable resolution frame is displayed with each pixel value programmed to a pixel 445 of the display panel 410.

The display driver 425 is further coupled to the gate lines 435 of the display panel 410. The display driver 425 provides gate signals to the gate lines 435 to select pixels 445 in one or more rows for programming with data signals on the data lines 440. In some embodiments, a gate driver coupled to the gate lines 435 is integrated with the display panel 410, and separate from the data driver coupled to the data lines 445.

The processor 405 is a circuitry coupled to the eye tracking module 160 and the display driver 425. The processor 405 generates the input data, such as a frame of video or other image, based on the focus area and non-focus area of a user's eyes as determined by the eye tracking module 160. The input data is transmitted to the display panel 410 for display via the display driver 425.

The processor 405 may execute an application that generates the input data. The processor 405 provides the input data to the display driver 425 to drive the pixels 445 of the display panel 410 according to the input data, such as in a raster-like fashion for each frame. In some embodiments, the processor 405 is separate from the HMD 105 including the electronic display 115. For example, the processor 405 may be the engine 145 of the console 120, as shown in FIG. 1, rather than a controller or other processing device on the HMD 105. The HMD may include a separate circuitry (e.g., a controller) for the electronic display 115 that is in communication with the processor 405, and which provides control signals to the gate driver 525 and data driver 510 in accordance with the input data from the processor 405. In other embodiments, the processor 405 is part of the HMD 105.

The processor 405 and the electronic display 115 may have a limited bandwidth connection. The connection may be wired or wireless. Variable resolution frames can be transmitted between the processor 405 and the electronic display 115 to reduce bandwidth use. The display driver 425 allows lower pixel resolution image data to be output on portions of the display panel 410 at full native resolution. Portions of the display panel 410 can display full resolution data for a focus area of the user's eye, while other portions of the display panel 410 can display reduced resolution data for a non-focus area. The reduced resolution data is output to native resolution by the electronic display 115.

Figure 5:
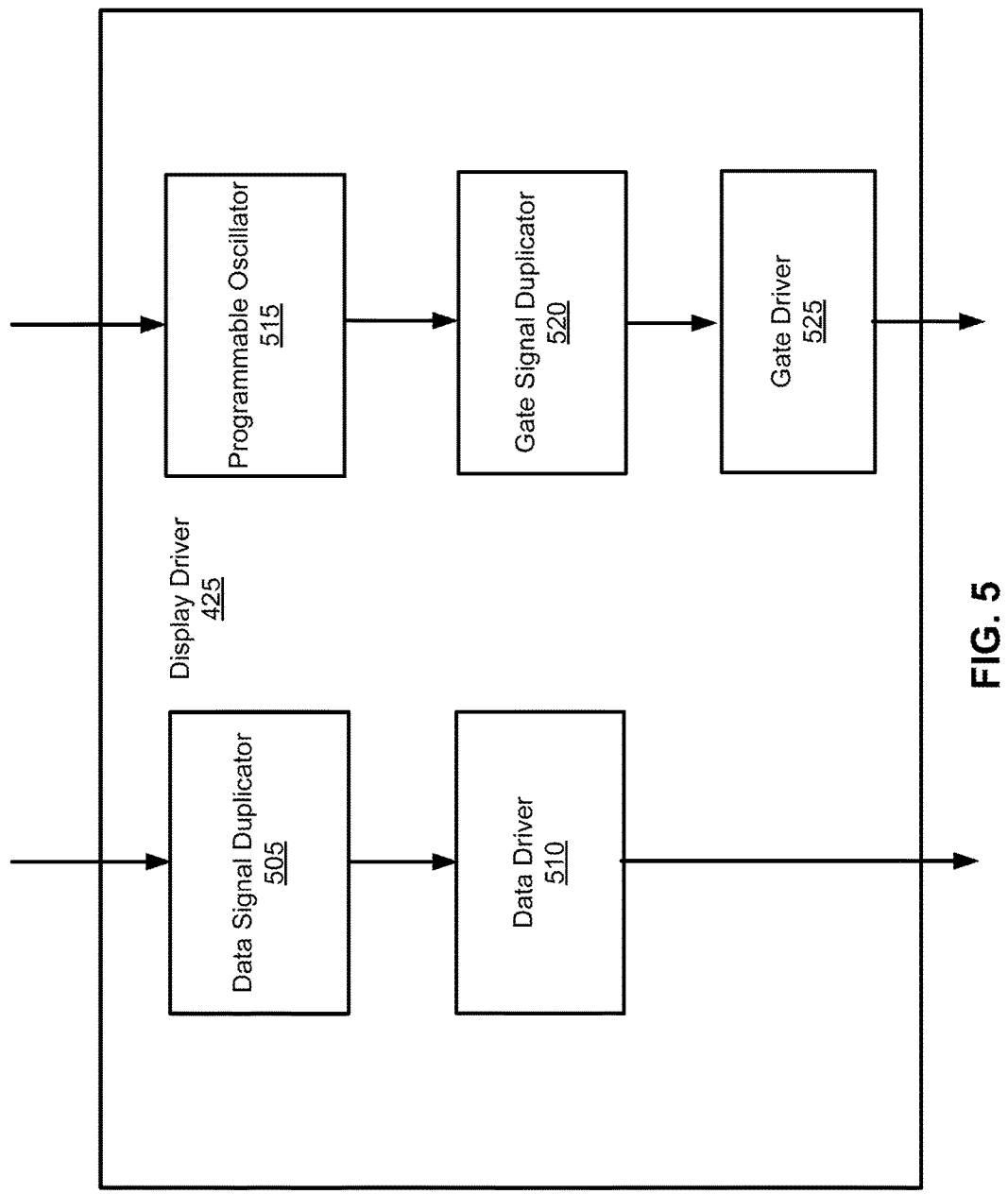
FIG. 5 shows a block diagram of a display driver of the electronic display, in accordance with some embodiments.

FIG. 5 shows a block diagram of the display driver 425, in accordance with some embodiments. The display driver 425 includes a data signal duplicator 505, a data driver 510, a programmable oscillator 515, and a gate signal duplicator 520, and a gate driver 525. In some embodiments, the gate driver 525 is separate from the display driver 425, such as integrated with the display panel 410.

The data signal duplicator 505 is coupled to the processor 405 and the data driver 510. The data signal duplicator 505 receives a stream of data signal values, such as from the processor 405. The data signal values may include gaze contingent content, such as foveated rendered data and/or variable resolution frames. The data driver 510 is coupled to the data lines 440 of the display panel 410 to provide data signals to the data lines 440 as received from the data signal duplicator 505. The stream of data signal values define a sequence of pixel values for programming the pixels of the display panel 410 for a frame, such as in a raster-like fashion. The data signal duplicator 505 can provide each (e.g., serial) data signal value received from the processor 405 to the data driver 510 in a different way based on a mode of operation. In a first mode (or "duplication" mode), the data signal duplicator 505 provides a common data signal value to two or more adjacent data lines 440 via the data driver 510. As such, pixels in two or more columns of the display panel can be programmed concurrently with a common pixel value for one or more rows selected by a gate signal. For a variable resolution frame, pixel values of the frame at low resolution (e.g., for a non-focus area) can be programmed with the data signal duplicator 505 operating in the first mode to program each pixel value at low resolution across two or more pixels of the display panel 410. In a second mode (or "non-duplication" mode), the data signal duplicator 505 provides individual data signal values to the two or more or more adjacent data lines 440, such as a sequential data signal value from a stream to each of the adjacent data lines 440. As such, the pixels in two or more columns of the display panel 410 of a selected row can be programmed individually. For a variable resolution frame, pixel values of the frame at high or native resolution (e.g., for a focus area) can be programmed with the data signal duplicator 505 operating in the second mode. Here, each pixel value at high or native resolution is programmed into individual pixels of the display panel 410. The variable resolution frame can be programmed within a scan cycle (e.g., in the raster-like fashion), with the data signal duplicator 505 switching between the first and second mode as appropriate for each data signal value and the gate signal duplicator 520 switching between the first and second mode as appropriate for each gate signal value.

The programmable oscillator 515 controls the gate clock signal frequency of the gate signals to the gate lines 435. The programmable oscillator 515 is coupled to the processor 405 to receive a clock frequency or row time $t_R$, and information (e.g., coordinates) defining the focus area. The programmable oscillator 515 generates a gate clock signal based on the received information. The gate signal duplicator 520 is coupled to the programmable oscillator 515. The gate signal duplicator 520 receives a stream of gate signal values according to a frequency defined by the gate clock signal, and provide each gate signal value received to the gate driver 525 based on a mode of operation.

In a first mode (or "duplication" mode), the gate signal duplicator 520 provides a common gate signal value to two or more adjacent gate lines 435 via the gate driver 525. As such, pixels in two or more rows of the display panel can be selected concurrently for programming with a common pixel value. For a variable resolution frame, pixel values of the frame at low resolution (e.g., for a non-focus area) can be programmed with the gate signal duplicator 520 operating in the first mode to program each pixel value at low resolution across two or more pixels of the display panel 410. In a second mode (or "non-duplication" mode), the gate signal duplicator 520 provides individual gate signal values to the two or more or more adjacent gate lines 435. As such, the pixels in two or more rows of the display panel 410 can be programmed individually and sequentially. For a variable resolution frame, pixel values of the frame at high or native resolution (e.g., for a focus area) can be programmed with the gate signal duplicator 520 operating in the second mode. Each pixel value at high or native resolution is programmed into individual pixels of the display panel 410. The variable resolution frame can be programmed within a scan cycle (e.g., in the raster-like fashion), with the gate signal duplicator 520 switching between the first and second mode as appropriate for each gate signal value. As such, the data signal duplicator 505 duplicates a data signal for one data line 440 to multiple adjacent data lines 440, and the gate signal duplicator 520 duplicates a gate signal for one gate line 435 to multiple adjacent gate lines 435.

Figure 6:
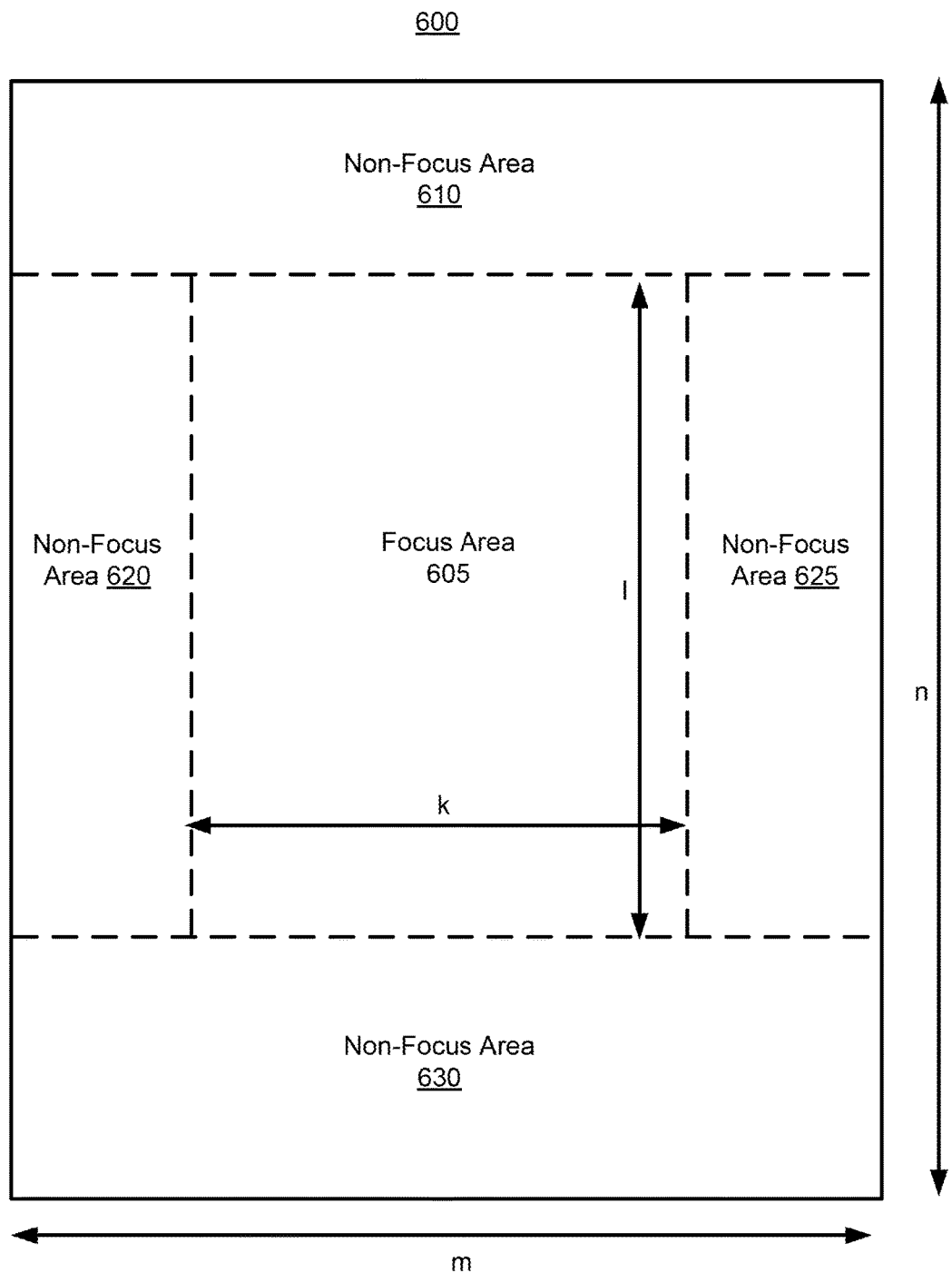
FIG. 6 shows an example of a variable resolution frame of image data for the display panel of the electronic display, in accordance with some embodiments.

FIG. 6 shows an example of a variable resolution frame 600 of image data for the display panel 410 of the electronic display 115, in accordance with some embodiments. The frame 600 may be generated by the processor 405 and provided to the pixels of the electronic display 115 for display in a (e.g., raster-like) scan cycle. The frame is defined by pixel values for a matrix of pixels that define a focus area 605, and non-focus areas 610, 615, 620, and 630.

The variable resolution frame 600 has a focus area 605 at a native pixel resolution for the pixels of the display panel 410. Here, the data signal duplicator 505 and gate signal duplicator 520 operate in the second mode to program each pixel value into an individual pixel of the display panel 410. Each pixel value of the image data for the focus area 605 is programmed to a pixel of the display panel 410 in the scan cycle.

The variable resolution frame 600 for the non-focus areas 610, 615, 620, and 630 have reduced resolution, but is programmed to a larger display area of the display panel 410. In particular, the non-focus areas 620 and 625 have reduced column resolution, and native row resolution because their gate lines are shared with the focus area 605. The non-focus areas 610 and 630 have reduced column and row resolution because they share no gate with the focus area 605. These reduced resolution areas allow the image data to have a smaller data size for each frame displayed on the display panel 410.

Figure 7:
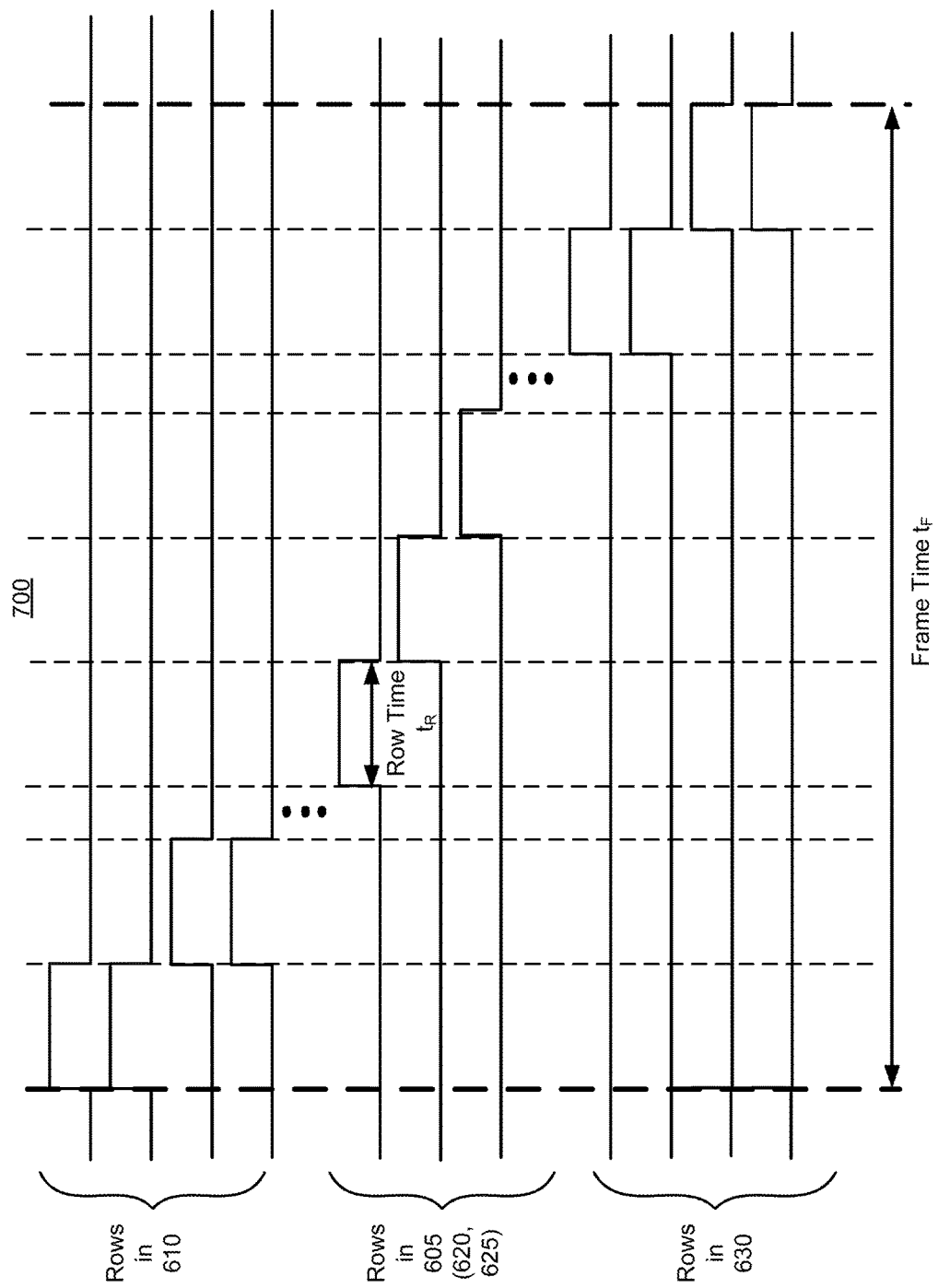
FIG. 7 shows a timing diagram for programming pixel of the display panel to display the variable resolution frame of FIG. 6, in accordance with some embodiments.

FIG. 7 shows a timing diagram 700 for programming pixels of the display panel 410 to display the variable resolution frame 600 of FIG. 6, in accordance with some embodiments. The timing diagram 700 shows a programming of the pixel rows of the frame 600 in a raster-like fashion within a frame time $t_F$. In a raster fashion, the top row is programmed first from left to right, and then the second row from left to right, and so forth until each pixel row has been programmed. As shown for the rows in the non-focus area 610, multiple rows can be selected via the gate signal duplicator 520 and programmed concurrently. Furthermore, for each row, multiple pixels of in the row from different columns can be programmed concurrently using the data signal duplicator 505.

For the rows in the focus area 605, each row is selected separately via the gate signals. The data signal duplicator 505 and gate signal duplicator 520 operate in the second mode (non-duplication mode) and do not duplicate pixel values across multiple columns or rows.

For the non-focus areas 620 and 625, which share rows with the focus area 605, each row is selected separately as shown. The gate signal duplicator 520 operates in the second mode (non-duplication mode), while the data signal duplicator 505 operates in the first mode (duplication mode) and duplicates pixel values across multiple columns.

For the non-focus areas 610 and 630, the gate signal duplicator 520 operates in the first mode (duplication mode), while the data signal duplicator 505 operates in the first mode (duplication mode). Multiple rows can be selected via the gate signal duplicator 520 and programmed concurrently. Furthermore, for each row, multiple pixels in the row from different columns can be programmed concurrently using the signal duplicator 505.

In some embodiments, the programmable oscillator 515 controls the row time $t_R$ for programming each row based on the properties of the variable resolution frame. For example, the row time $t_R$ may be defined by Equation 1:

$$t_R = \frac{t_F}{l + \frac{n-l}{2}} \qquad (1)$$

where $t_F$ is a frame time of the frame, l is a pixel row size of the focus area within the frame, and n is a pixel row size of the frame as shown in FIG. 6.

The variable resolution frame 600 has reduced bandwidth usage when relative to standard, full resolution frames. For example, the bandwidth usage B for video data having variable resolution frames may be defined by Equation 2:

$$B = f * \left(k + \frac{m-k}{2}\right) * s * \left(l + \frac{n-l}{2}\right) \qquad (2)$$

where f is a number of frames, l is the pixel row size of the focus area within the frame, n is the pixel row size of the frame, k is the pixel column size of the focus area within the frame, m is the pixel column size of the frame, and s is the bit size of each pixel. For example, s may be 24 for a pixel having three (e.g., R, G, B) sub-pixels at 8 bits per sub-pixel channel.

In comparison, for a full resolution frame, the row time $t_R$ is defined by Equation 3:

$$t_R = \frac{t_F}{n} \tag{3}$$

and the bandwidth B is defined by Equation 4:

$$B = f*m*s*n \tag{4}$$

where f is a number of frames, n is the pixel row size of the frame, m is the pixel column size of the frame, and s is the bit size of each pixel. It is noted that for l<n and/or k<m, the bandwidth usage for the variable resolution frame as defined in Equation 3 is smaller than the bandwidth usage as defined in Equation 4 for the full resolution frame.

Figure 8:
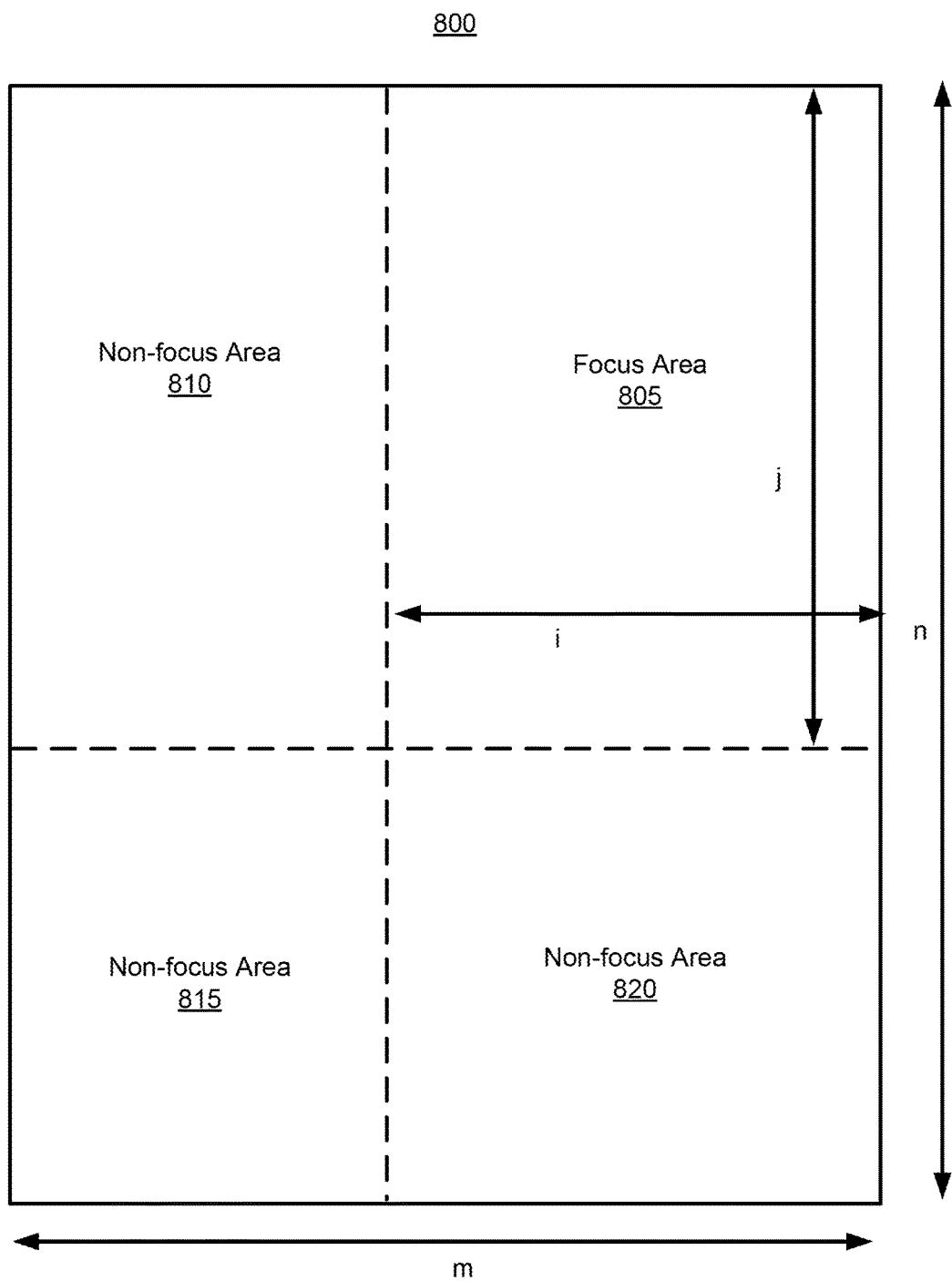
FIG. 8 shows an example of a variable resolution frame of image data for the display panel of the electronic display, in accordance with some embodiments.

FIG. 8 shows an example of a variable resolution frame 800 of image data for the display panel 410 of the electronic display 115, in accordance with some other embodiments. The frame 800 has a focus area 805 located at the top right corner of the frame 800 rather than the center as shown for the frame 600 in FIG. 6. The frame 800 is defined by pixel values for a matrix of pixels that define a focus area 805, and non-focus areas 810, 815, and 820.

The focus area 805 is at a native pixel resolution for the pixels of the display panel 410. The data signal duplicator 505 and gate signal duplicator 520 operate in the second mode to program each pixel value into an individual pixel of the display panel 410. The non-focus area 810 has reduced column resolution and native row resolution, the non-focus area 815 has reduced column and row resolution, and the non-focus area 820 has reduced row resolution and native column resolution.

Figure 9:
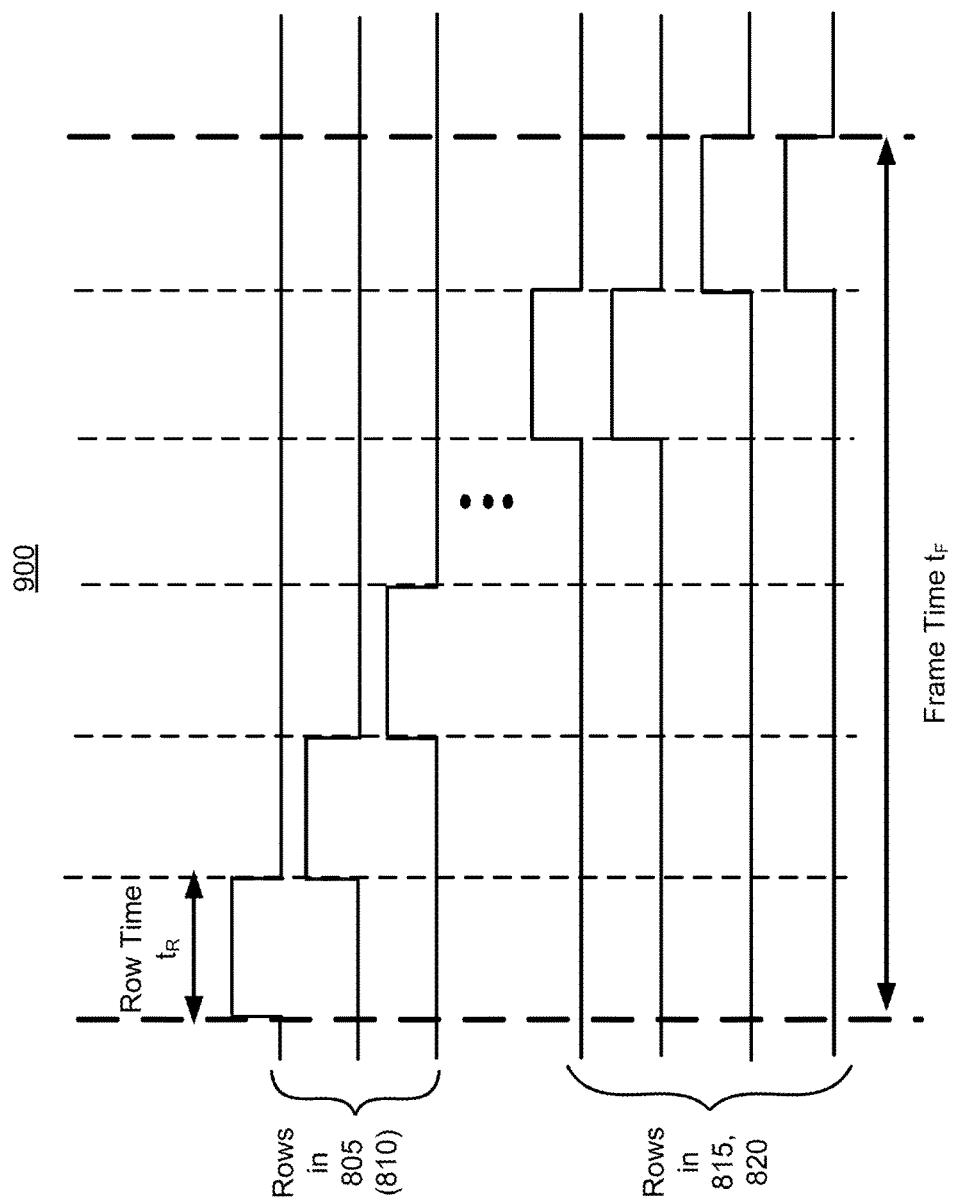
FIG. 9 shows a timing diagram for programming pixel rows of the display panel to display the variable resolution frame of FIG. 8, in accordance with some embodiments.

FIG. 9 shows a timing diagram 900 for programming pixels of the display panel 410 to display the variable resolution frame 800 of FIG. 8, in accordance with some embodiments. The timing diagram 800 shows a programming of the pixel rows of the frame 600 in a raster-like fashion within a frame time $t_F$. As shown for the rows in the focus area 805, each row is selected separately by the gate signal duplicator 520, and each column is selected separately by the data signal duplicator 505. For the non-focus area 810, which shares rows with the focus area 805, each row is selected separately by the gate signal duplicator 520 but multiple columns may be selected concurrently by the data signal duplicator 505. For the non-focus areas 815 and 820 that share rows with each, multiple rows are selected together by the gate signal duplicator 520. In the non-focus area 815, the data signal duplicator 505 selects multiple columns concurrently. In the non-focus area 820 (e.g., sharing columns with the focus area 805), the data signal duplicator 505 selects each column separately.

In some embodiments, the programmable oscillator 515 controls the row time $t_R$ for programming each row based on the properties of the variable resolution frame. For example, the row time $t_R$ may be defined by Equation 5:

$$t_R = \frac{t_F}{j + \frac{n-j}{2}} \tag{5}$$

where $t_F$ is a frame time of the frame, j is a pixel row size of the focus area within the frame, and n is a pixel row size of the frame as shown in FIG. 8.

The variable resolution frame 800 has reduced bandwidth usage when relative to standard, full resolution frames. For example, the bandwidth usage B for video data having variable resolution frames may be defined by Equation 6:

$$B = f*\left(i + \frac{m-i}{2}\right)*s*\left(j + \frac{n-j}{2}\right) \tag{6}$$

where f is a number of frames, j is the pixel row size of the focus area within the frame, n is the pixel row size of the frame, i is the pixel column size of the focus area within the frame, m is the pixel column size of the frame, and s is the bit size of each pixel.

Figure 10:
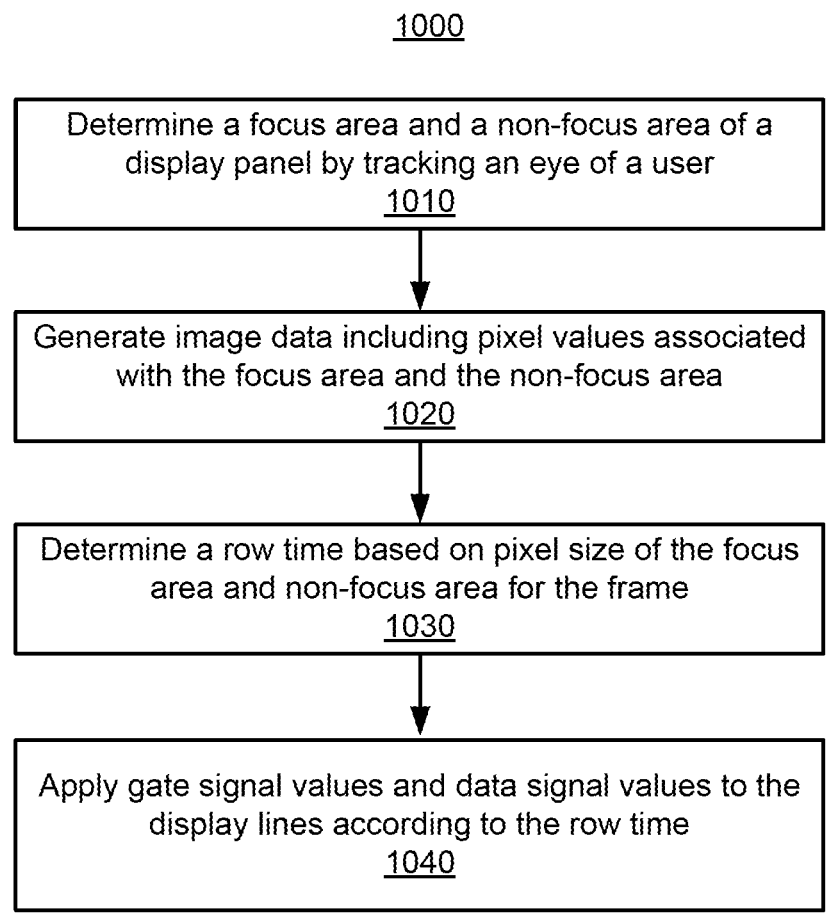
FIG. 10 shows a flow chart of a process for driving a display panel based on focus and non-focus areas of a user's eye on the display panel, in accordance with some embodiments.

FIG. 10 shows a flow chart of a process 1000 for driving a display panel based on focus and non-focus areas of a user's eye on the display panel, in accordance with some embodiments. A processor 405 determines 1010 a focus area and a non-focus area of a display panel 410 by tracking position of an eye of a user. For example, the eye tracking module 160 determines the position of the eye of the user, and provides the position to the processor 405. The processor 405 may be the engine 145 of the console 120, or a circuitry of the HMD 105 such as the scene rendering module 185.

The processor 405 generates 1020 image data including pixel values associated with the focus area and the non-focus area. The image data may include a variable resolution frame of pixel values having native pixel resolution in the focus area, and reduced resolution in the non-focus area as discussed above for the image data 600 or 800. After the image data is generated, the image data is provided to the electronic display 115 to display the pixel values of the frame in a scan cycle.

A programmable oscillator 515 of the display driver 425 determines 1030 a row time $t_R$ for programming the display panel 410 based on the pixel size of the focus area and a pixel size of a non-focus area for the frame. For example, the row time $t_R$ may be determined based on Equations 1 or 3 as discussed above.

The display driver 425 applies 1040 gate signal values and data signal values to the display lines of the display panel 410 according to the row time $t_R$. Furthermore, the display driver selectively operates the gate signal duplicator 520 and the data signal duplicator 505 in either the duplication or non-duplication mode depending on the area of the display panel. Non-focus areas defined having reduced resolution receive row and/or column duplication, while focus areas are displayed at native resolution.

The process 1000 can be repeated for multiple frames of image data. As the focus area and non-focus area changes based on user eye movement, the image data is generated accordingly with variable pixel resolution. Furthermore, the row time (e.g., and thus signal clock frequency) and signal duplication can be adjusted according to the changes in the focus area and non-focus area.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An electronic display, comprising:
    a display panel including display lines; and
    a display driver coupled to the display panel, the display driver including a programmable oscillator configured to:
        generate a clock signal for the display lines defining a row time for programming each row of a frame based on a frame time for programming the frame, a first pixel row size defining a number of rows included in a high resolution area within the frame, and a second pixel row size defining a number of total rows in the frame, the total rows including the high resolution area and at least one low resolution area; and
        update the clock signal including the row time based on a change in the first pixel row size.

2. The electronic display of claim 1, wherein the row time is defined by $$\frac{t_F}{l + \frac{n-l}{2}},$$

where $t_F$ is the frame time of the frame, l is the first pixel row size, and n is the second pixel row size.

3. The electronic display of claim 1, wherein the display driver further includes a signal duplicator configured to connect and disconnect adjacent display lines to vary the number of rows included in the high resolution area within the frame.

4. The electronic display of claim 3, wherein the signal duplicator is further configured to:
    receive a stream of signal values;
    in a first mode of the signal duplicator, provide a first signal value to a first display line and a second display line adjacent to the first display line; and
    in a second mode of the signal duplicator, provide a second signal value to the first display line and a third signal value to the second display line, the third signal value being subsequent to the second signal value in the stream of signal values.

5. The electronic display of claim 4, wherein the signal duplicator receives the stream of signal values from a console separate from the electronic display.

6. The electronic display of claim 4, wherein pixels of the display panel addressed by the first and second display lines display a lower resolution image in the first mode and a higher resolution image in the second mode.

7. The electronic display of claim 6, wherein the pixels of the display panel correspond with a non-focus area of the user's eye in the first mode and the focus area of the user's eye in the second mode.

8. The electronic display of claim 7, further comprising an eye tracking system configured to track movement of the user's eye over time, the signal duplicator selectively operates in the first mode or the second mode for the first and second gate lines based on the movement of the user's eye over time.

9. The electronic display of claim 7, wherein the signal duplicator, for the frame, operates in the first mode for a first portion of the display lines corresponding with first pixels of the non-focus area and the second mode for a second portion of the display lines corresponding with second pixels of the focus area.

10. The electronic display of claim 3, wherein signal duplicator is a gate signal duplicator and the display lines are gate lines.

11. The electronic display of claim 3, wherein the signal duplicator is a data signal duplicator and the display lines are data lines.

12. A method, comprising:
    determining, by a processing circuitry, a focus area of a user's eye on a display panel based on tracking position of the user's eye, the display panel including display lines controlling pixels of the display panel; and
    generating, by a programmable oscillator, a clock signal for the display lines, the clock signal defining a row time for programming each row of a frame based on a frame time for programming the frame, a first pixel row size defining a number of rows included in the focus area of a user's eye within the frame, and a second pixel row size defining a number of rows included in the frame.

13. The method of claim 12, wherein the row time is defined by tFl+n−l2, where $t_F$ is the frame time of the frame, l is the first pixel row size, and n is the second pixel row size.

14. The method of claim 12, further comprising, by a signal duplicator, connecting and disconnecting adjacent display lines to vary the number of rows included in the high resolution area within the frame.

15. The method of claim 14, further comprising, by the signal duplicator:
    receiving a stream of signal values;
    in a first mode of the signal duplicator, providing a first signal value to a first display line and a second display line adjacent to the first display line; and
    in a second mode of the signal duplicator, providing a second signal value to the first display line and a third signal value to the second display line, the third signal value being subsequent to the second signal value in the stream of signal values.

16. The method of claim 15, wherein pixels of the display panel addressed by the first and second display lines display a lower resolution image in the first mode and a higher resolution image in the second mode.

17. The method of claim 16, wherein the pixels of the display panel correspond with a non-focus area of the user's eye in the first mode and the focus area of the user's eye in the second mode.

18. The method of claim 17, further comprising:
    tracking, by an eye tracking system, movement of the user's eye over time; and
    selectively operating, by the signal duplicator, in the first mode or the second mode for the first and second gate lines based on the movement of the user's eye over time.

19. A head mounted display, comprising:
    a display panel including display lines; and a display driver coupled to the display panel, the display driver including a programmable oscillator configured to:
  generate a clock signal for the display lines defining a row time for programming each row of a frame based on a frame time for programming the frame, a first pixel row size defining a number of rows included in a high resolution area within the frame, and a second pixel row size defining a number of total rows in the frame, the total rows including the high resolution area and at least one low resolution area; and
  update the clock signal including the row time based on a change in the first pixel row size.

20. The head mounted display of claim 19, wherein the row time is defined by $$\frac{t_F}{l + \frac{n-l}{2}},$$

where $t_F$ is the frame time of the frame, l is the first pixel row size, and n is the second pixel row size.

* * * * *